United States Patent [19]
Hintz et al.

[11] Patent Number: 6,163,783
[45] Date of Patent: Dec. 19, 2000

[54] CHECK DATA OPERATION FOR DB2

[75] Inventors: Thomas E. Hintz; Kerry C. Tenberg, both of Austin, Tex.

[73] Assignee: BMC Software, Inc., Houston, Tex.

[21] Appl. No.: 08/168,976

[22] Filed: Dec. 16, 1993

[51] Int. Cl.⁷ .................................................. G06F 17/30
[52] U.S. Cl. ........................................................ 707/201
[58] Field of Search ................................ 395/600, 425; 364/282.1; 707/1–3, 7–8, 200–201

[56] References Cited

U.S. PATENT DOCUMENTS

| | | | |
|---|---|---|---|
| 4,933,848 | 6/1990 | Haderle et al. | 364/300 |
| 5,089,985 | 2/1992 | Chang et al. | 395/600 |
| 5,133,068 | 7/1992 | Crus et al. | 395/600 |
| 5,307,484 | 4/1994 | Baker et al. | 395/600 |
| 5,386,557 | 1/1995 | Boykin et al. | 395/600 |

OTHER PUBLICATIONS

The Art of Computer Programming, vol. 3, Sorting and Searching pp. 159–168 Donald E. Kuuth, Addison–Wesley Publishing Company, 1973.

*Primary Examiner*—Hosain T. Alam
*Attorney, Agent, or Firm*—Howrey Simon Arnold & White, LLP

[57] ABSTRACT

A single phase CHECK DATA operation for DB2 entails creating a special SORT record for each prinary key and each foreign key, collating the special SORT records in a particular way to group together the SORT records for each primary key, and performing diagnostic operations on the sorted records.

1 Claim, 6 Drawing Sheets

Sort Record Layout

Sort Key

| PK ID | Primary key identifier | 2 bytes |
| Relation Key | Foreign/primary key value | Variable |
| FK ID | Foreign key identifier (o if primary key) | 2 bytes |
| Row ID | Row identifier if FK | 4 bytes | ns
CHECK DATA OPERATION FOR DB2

BACKGROUND OF THE INVENTION

In the prior art, a well-known process that is executed periodically for DB2 installations is a CHECK DATA operation to check the referential integrity of a database. Referential integrity is described in general terms at pages 143–145 of the textbook "Fundamentals of Database Systems" by Elmasri & Navathe (1989). Generally speaking, this entails ensuring that each "foreign key" maps to exactly one "primary key" and that the primary key is a valid one. As an example, suppose that the following data tables exist in a DB2 database of information about a company:

(a) a Department table containing multiple rows or records, one per department in the company, each record having a Department identifier (e.g., Accounting, Maintenance, Operations, etc.) as well as other information about the department in question. The Department identifier serves as the primary key for the Department table;

(b) an Employee table containing multiple rows or records, each representative of a specific employee identified by a unique employee number (which serves as the primary key for the Employee table). Assume that each row or record in the Employee table also includes a department identifier indicating the department to which the employee in question is assigned.

In the above hypothetical Employee table, each row or record has both (i) a primary key, namely the value in the employee number field, e.g., "12345," which, within the employee table, is unique to that employee record; and (ii) a foreign key, i.e., the value in the department identifier field, e.g., "Accounting," which refers to the primary key of a specific row or record in the Department table. The foreign key "Accounting" may be associated with more than one employee record, because more than one employee may be assigned to the Accounting department. Nor is the foreign key "Accounting" unique to the Employee table itself, because other tables containing information about the company might refer to the Department table. The foreign keys for a given DB2 table space are defined in the DB2 catalog and can be determined by a routine lookup process.

Some additional nomenclature is introduced here to aid in understanding the terminology used. A principal term used here is that of a "data set." Generally speaking, a data set is a collection of data that is referred to in an operating system environment (e.g., the well-known MVS operating system environment) by a single name, in much the same way as a word processing file might be given a single directory name for easy retrieval of the data in the file (even though the data might phyically be stored in a variety of locations on a disk). Examples of MVS data sets include DB2 indexes and DB2 table spaces. Typically, maintenance operations in the DB2 environment involve three steps: First, reading the data to be reorganized (e.g., from a table space or index), often from a variety of different physical locations identified by a data set name. The step of data reading is typically referred to as an UNLOAD process that involves physically copying the data to some other memory or other storage. The second step is that of sorting or otherwise ordering the data to conform to the desired ordering and performing any other desired processing. Finally, the third step is that of rewriting the sorted data to storage (table space or index) designated with the same data set name. The third step is typically referred to as a RELOAD process.

A conventional CHECK DATA operation is illustrated in general terms in FIG. 1 and on page 22 of IBM's "DB2 Version 2 Release 2 Utilities Guide," Document No. GG24-3390-00, July 1989. Foreign keys from one or more DB2 table spaces 120 are UNLOADed in a first processing phase 105, from the data records themselves and/or from foreign-key indexes if they exist. A work or intermediate data set 110 is created from the output of the first processing phase 105. In a second processing phase 115, the contents of the work data set 110 are methodically cross-checked against one or more primary key index(es) 100 in question, and appropriate diagnostic message(s) 125 are displayed.

A significant disadvantage of the foregoing prior-art approach to the CHECK DATA operation is that the various table-space data records and/or foreign-key indexes are UNLOADed one after another, and subsequently the primary-key indexes are read and compared by "probing" each primary key index separately for each foreign key value. The elapsed time required for the operation thus includes the sum of the elapsed times required for each of these input/output (I/O) operations. This is especially undesirable in installations which attempt to operate 24 hours a day, seven days a week; it may be highly undesirable to disable a data set, in effect, for the length of time required for a multi-phase CHECK DATA operation. Moreover, such an approach plainly requires additional I/O steps, which can have tangible financial costs associated therewith. In some actual systems, storage space may be at a premium and thus the use of storage to create a working or intermediate data set may be undesirable.

SUMMARY OF THE INVENTION

A method in accordance with the invention entails performing a single-phase CHECK DATA operation for a DB2 environment by creating a special SORT record for each primary key and each foreign key, collating the special SORT records in a particular way to group together the SORT records for each primary key, and performing diagnostic operations on the sorted records.

DETAILED DESCRIPTION OF SPECIFIC EMBODIMENTS

One illustrative embodiment of the invention is described below as it might be implemented by loading of program of instructions (e.g., executable code or compilable or interpretable source code) on a general purpose computer system from a program storage device such as a magnetic tape, a floppy disk, an optical disk, etc., and causing the computer system to execute the program. In the interest of clarity, not all features of an actual implementation are described in this specification. It will of course be appreciated that in the development of any such actual implementation (as in any software development project), numerous implementation-specific decisions must be made to achieie the developers' specific goals and subgoals, such as compliance with system- and business-related constraints, which will vary from one implementation to another. Moreover, it will be appreciated that such a development effort might be complex and time-consuming, but would nevertheless be a routine undertaking of software engineering for those of ordinary skill having the benefit of this disclosure.

Figure 1:
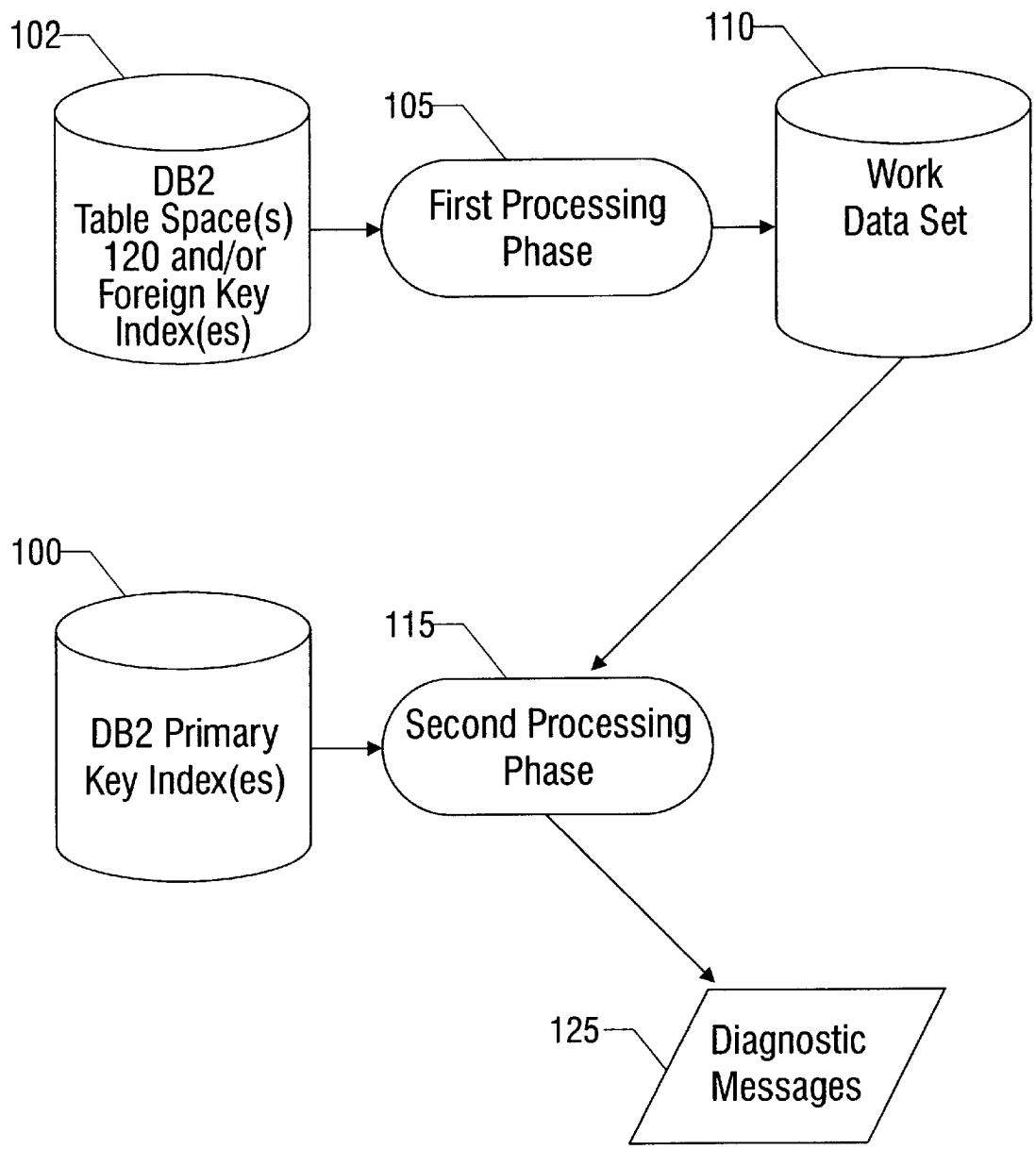
FIG. 1 is a data flow diagram overview of a typical prior-art two-phase CHECK DATA process in a DB2 database.
Figure 2:
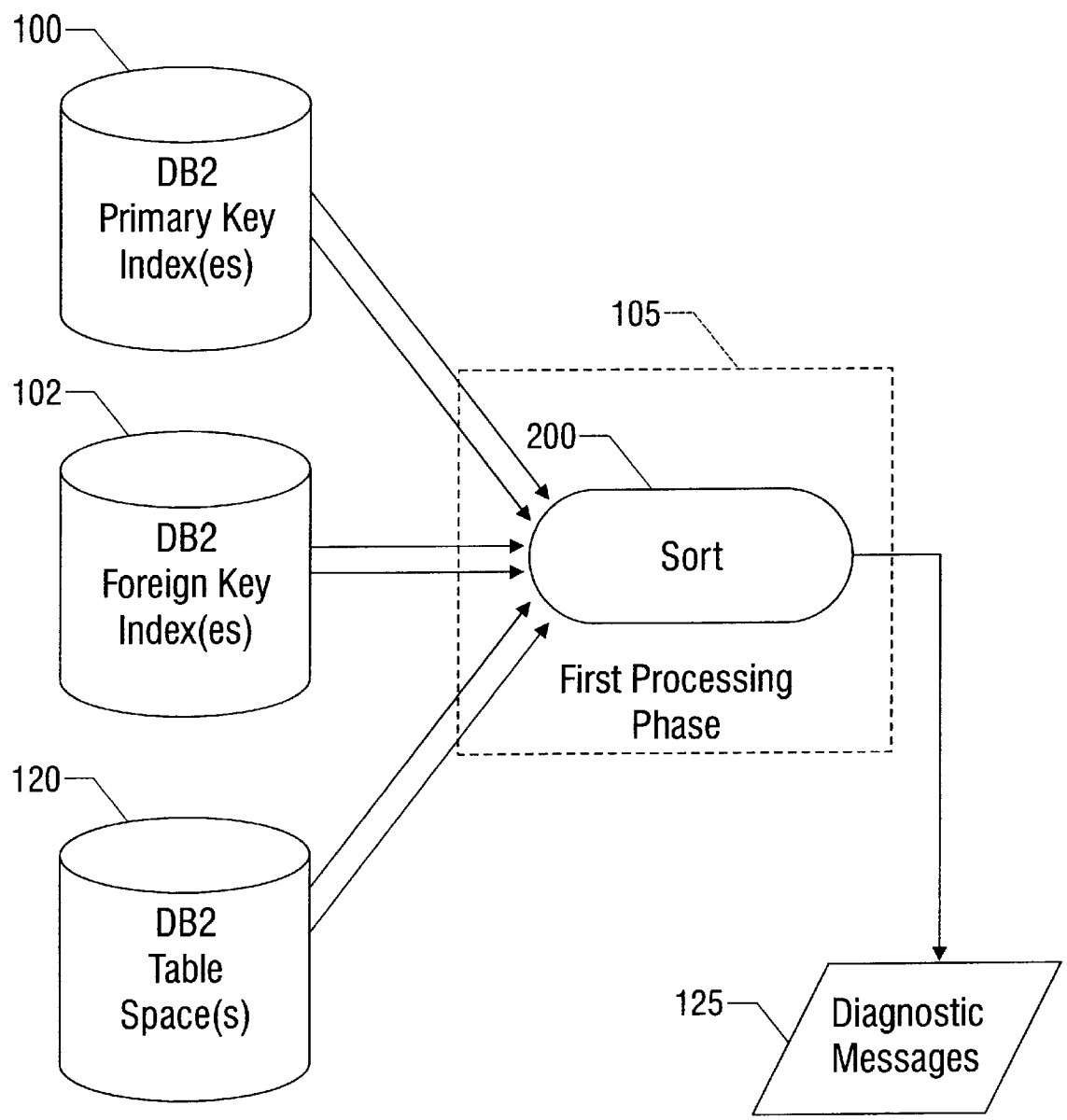
FIG. 2 is a data flow diagram, and FIG. 3 a flow-chart diagram, of an improved single-phase CHECK DATA process.
Figure 3:
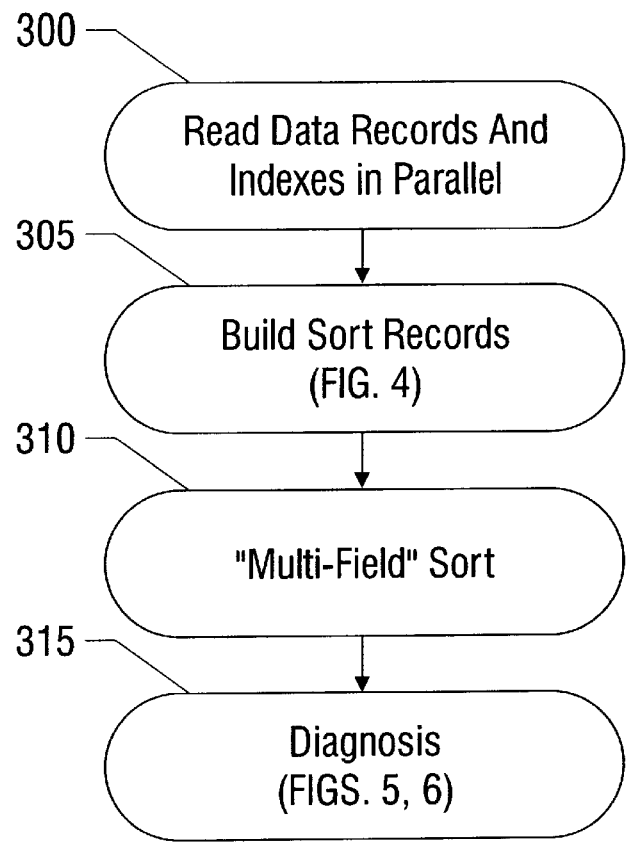

Referring to FIGS. 2 and 3, an improved CHECK DATA operation takes advantage of an innovative use of the system SORT routine (e.g., the standard SORT routine supplied with the IBM MVS operating system or any desired third-party SORT routine). As shown in FIG. 2, some or all of a series of DB2 primary key index(es) 100, DB2 foreign key index(es) 102, and physical data rows in one or more DB2 table space(s) 120 are read in parallel as necessary to extract the foreign keys and the primary keys, i.e., to obtain the required information about each separate combination of a primary key value and and whatever foreign keys exist (e.g., each combination of an employee number and a department identifier) that exists in the actual data records. That information is fed to a SORT routine 200. The output of the SORT routine is examined to diagnose potential problems with referential integrity.

Referring now to FIG. 3, the method of the invention is shown in more detail. At block 305, a series of SORT input records is constructed, one SORT record corresponding to each occurrence of a foreign key (if any) and one SORT record corresponding to each occurrence of a primary key (if any) as illustrated by the hypothetical example discussed below. The SORT records may be constructed by reading the DB2 table space(s) 120 or the various indexes 100 and 102 to extract the foreign key occurrences and primary key occurrences, depending on which are available and which would be least costly in terms of system resources, as well known to those of ordinary skill; for example, if a department index is available it is usually more efficient to extract the Department key occurrences from that index instead of from the actual data records in a table space 120.

Figure 4:
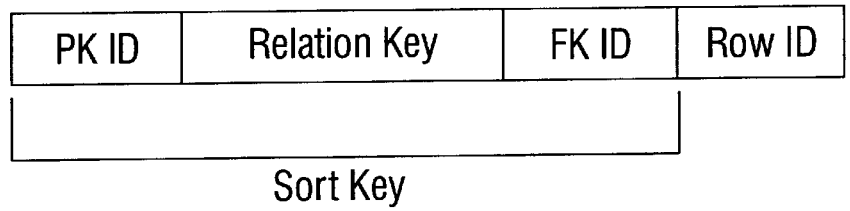
FIG. 4 shows a sort key used in the process.

The specific format of the SORT record is shown in FIG. 4. It may be understood by reference to the following example of a hypothetical sequence of SORT records for a series of data records, where the data records are organized into the two tables discussed above, namely Department and Employees. As can be seen, the SORT records focus on the Department data table; bracketed comments are for purposes of explanation:

| PRIMARY KEY | RELATION KEY | FOREIGN KEY ID | ROW ID |
|---|---|---|---|
| Department | Accounting | 0 [No foreign key] | [N/A] |
| Department | Accounting | 01 [Employee] | 23456 [Adams] |
| Department | Accounting | 01 [Employee] | 76543 [Baker] |

Returning to FIG. 3, the SORT records so constructed are fed to the system SORT routine where a three-part sort key is used. Because the SORT record is formatted as described above, the output of the SORT routine 200 is a series of records sorted in the same order as the key order in the formatting.

Figure 5A:
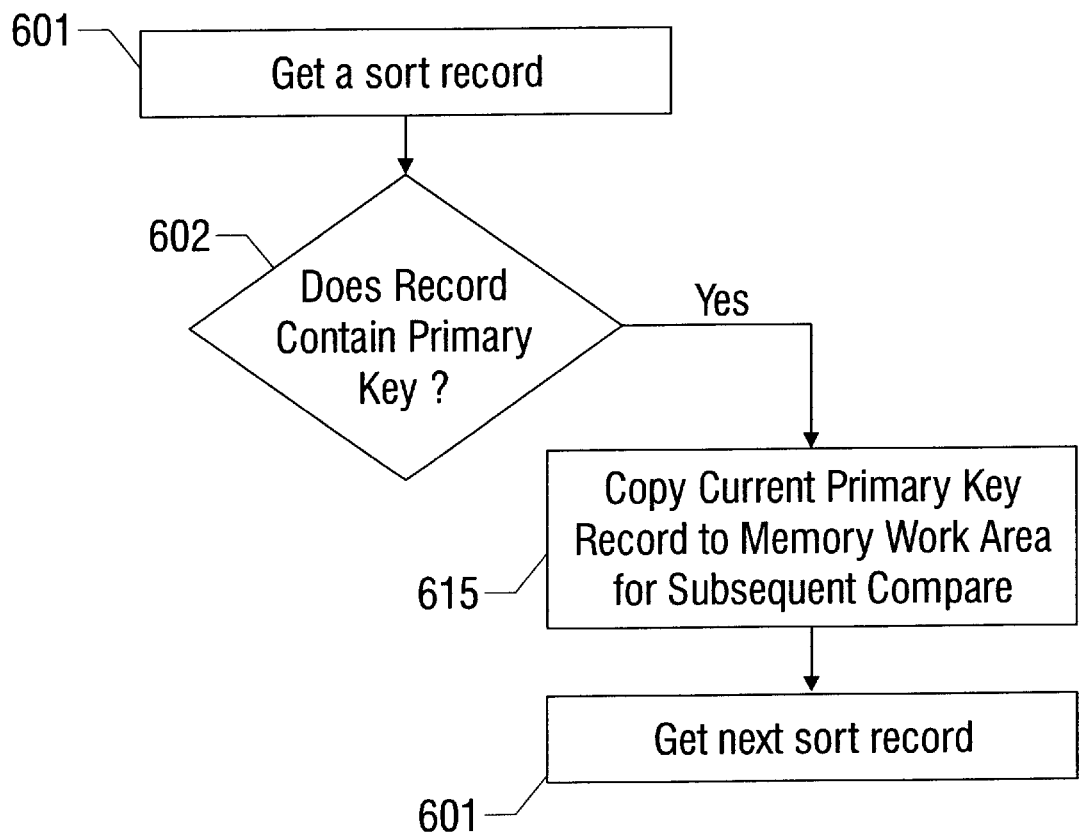
FIGS. 5 and 6 are pseudocode and flow-chart representations of an illustrative diagnostic routine.
Figure 5B:
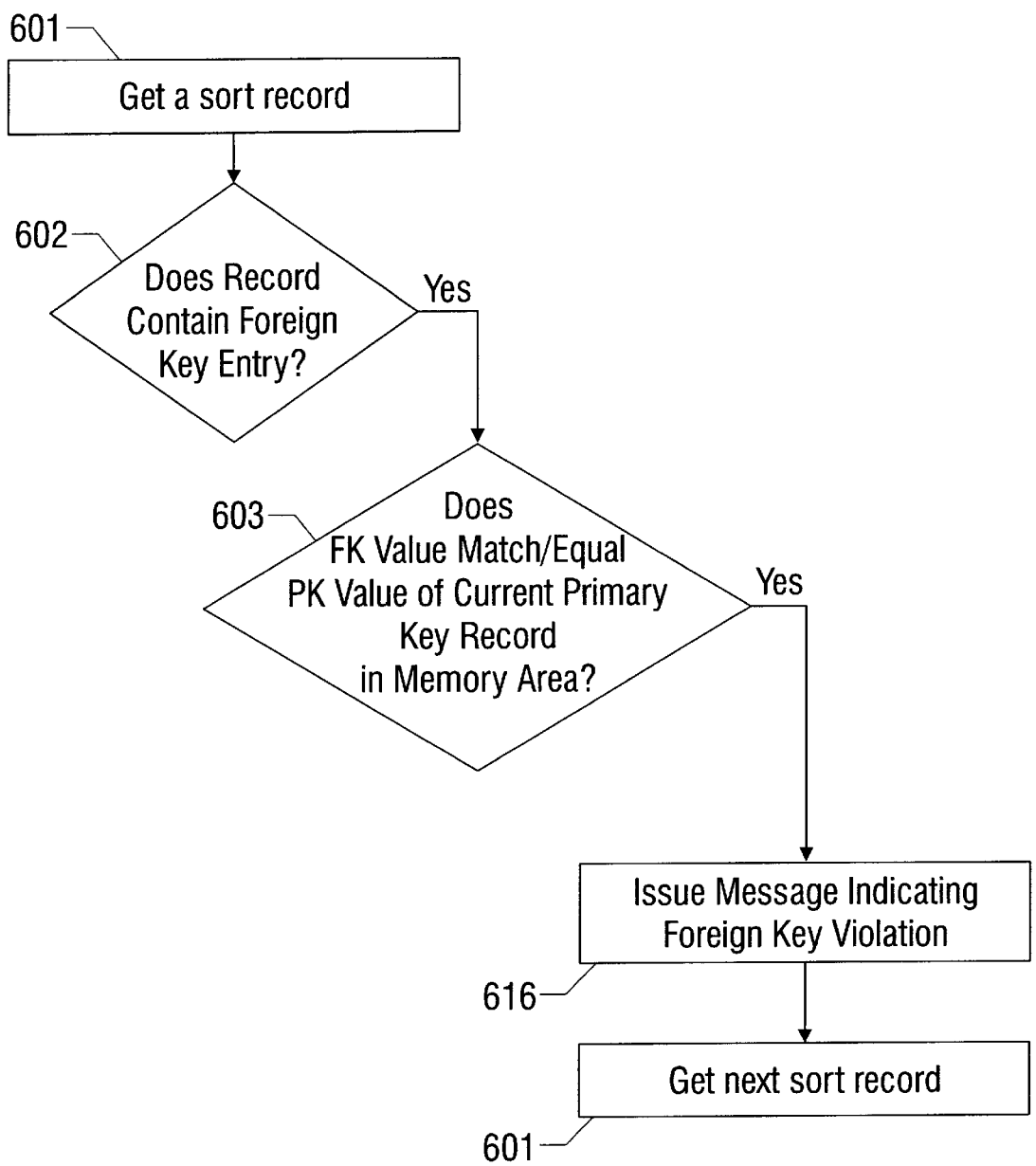
Figure 6:
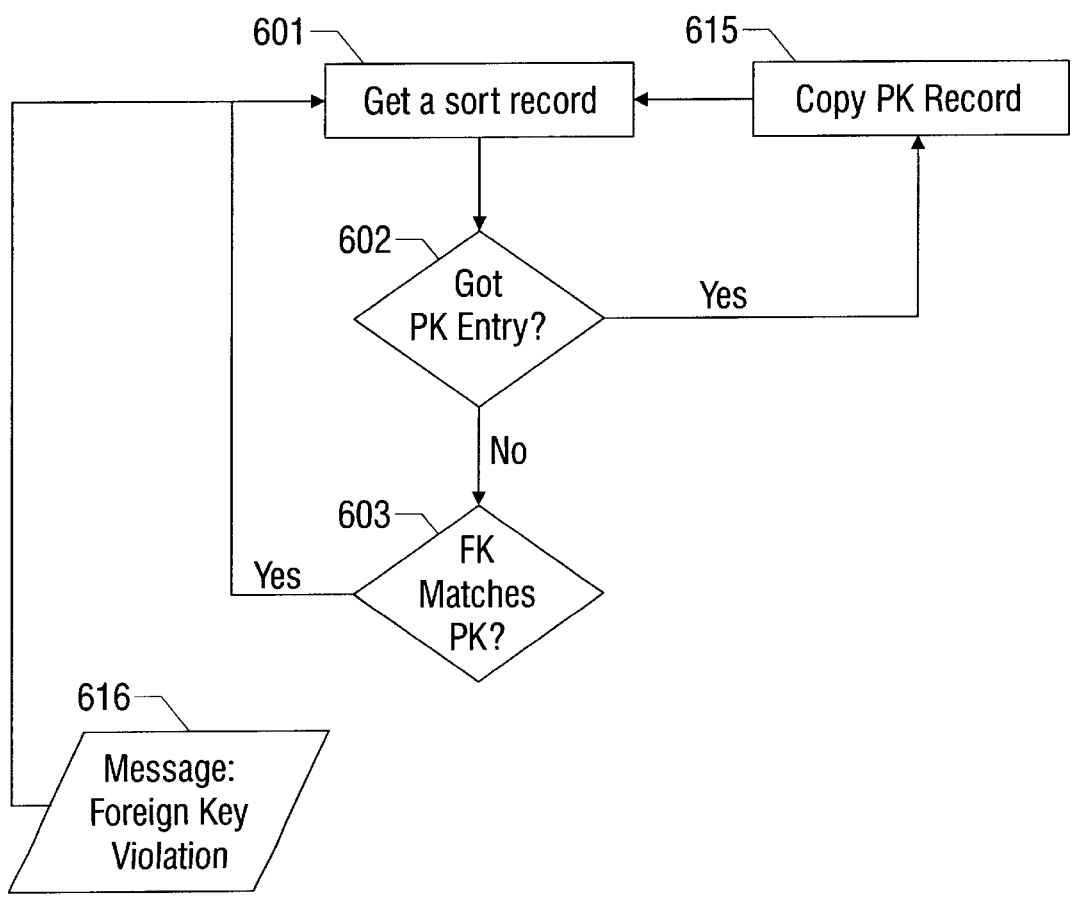

As shown in block 315 and FIGS. 5 and 6, the output of the SORT routine is tested, using any convenient diagnostic process, to determine whether any integrity problems exist in the data being tested. FIG. 5 shows a pseudocod representation of one diagnostic process, which is also shown in graphic flow chart form in FIG. 6.

A significant advantage of the method described herein is that the data-record and index-entry data are read in parallel, thus reducing elapsed time. Because the sorted order of the SORT records conforms to the format described above, integrity checking is a comparatively simple matter. Moreover, because a work data set 110 is not created, I/O resources are thereby conserved.

What is claimed is:

1. A single-phase method of checking DB2 referential integrity, comprising the steps of:

(a) extracting, in parallel, (1) all of zero or more instances of one or more specified foreign keys, referred to as FK occurrences, and (2) zero or more insetances of one or more specified primary keys, referred to as PK occurrences;

(b) constructing a SORT record for each said FK occurrence, referred to as an FK SORT record, and a SORT record for each said PK occurrence, referred to as a PK SORT record;

(c) collating the FK SORT records with the PK SORT records into a single sequence of SORT records to group together the PK SORT records for each primary key, with the respective FK SORT records for each of any foreign key associated with each said primary key; and (d) performing a specified diagnosis routine utilizing said single sequence of SORT records as an input.

* * * * *